United States Patent [19]

Bereiter et al.

[11] 4,366,869

[45] Jan. 4, 1983

[54] HAMMER DRILL

[75] Inventors: Rolf Bereiter, Buchs, Switzerland; Franz Chromy, Levis, Austria

[73] Assignee: Hilti Aktiengesellschaft, Schaan, Liechtenstein

[21] Appl. No.: 188,559

[22] Filed: Sep. 18, 1980

[30] Foreign Application Priority Data

Sep. 24, 1979 [DE] Fed. Rep. of Germany ....... 2938513

[51] Int. Cl.[3] .............................................. B23B 45/16

[52] U.S. Cl. ..................................... 173/109; 173/48; 173/118; 173/122; 74/22 R

[58] Field of Search ................. 173/48, 109, 116, 117, 173/118, 122; 74/22 R, 22 A

[56] References Cited

U.S. PATENT DOCUMENTS 3,828,863 8/1974 Bleicher et al. ....................... 173/48
3,874,460 4/1975 Schmid et al. ...................... 173/109
4,064,949 12/1977 Chromy .......................... 173/116 X

FOREIGN PATENT DOCUMENTS 207182 2/1968 U.S.S.R. ............................. 173/118

*Primary Examiner*—Wm. Carter Reynolds
*Attorney, Agent, or Firm*—Toren, McGeady and Stanger

[57] ABSTRACT

A hammer drill is arranged to rotate and also apply percussive force to a tool receptacle. The percussive force is transmitted from a shaft to a drive piston which, in turn, reciprocates a percussion piston which drives the tool receptacle. The hammer drill includes a housing and a bearing rotatably mounted in the housing. The shaft is rotatably mounted in the bearing and its axis extends perpendicularly of the axis of rotation of the bearing. The bearing supports a contact rim which is in meshed engagement with the shaft. The contact rim is displaceably into frictional contact with a brake member for holding the contact rim against rotation while the bearing rotates carrying with it the shaft. Due to its meshed engagement with the contact rim, the shaft rotates about its own axis causing the drive piston to reciprocate.

7 Claims, 4 Drawing Figures

HAMMER DRILL

SUMMARY OF THE INVENTION

The present invention is directed to a hammer drill incorporating a drive piston and a percussion piston along with a shaft which extends perpendicularly of the axis of the pistons, and provides the actuation of the drive piston.

There are known hammer drills which have a shaft for reciprocating a drive piston within a guide cylinder. A percussion piston is slidably supported in the guide cylinder forward of the drive piston with an air cushion between them so that reciprocation of the drive piston is transmitted to the percussion piston. During the use of such a hammer drill, at the end of each forward stroke the percussion piston contacts directly or indirectly the rearward end face of a tool inserted into the forward end of the hammer drill and in this way transfers percussive force to the tool.

The shaft receives its rotary motion from a pinion driven by a motor. As a result, the rhythm of the percussion piston is determined by the transmission speed of this drive arrangement. Such an arrangement, however, has the considerable disadvantage that, independent of the manner in which the hammer drill is used, the maximum percussive force is always transmitted to the tool and causes problems when drilling percussion-sensitive materials, such as clay tile and vitrified clay plates. Attempts have been made to correct these problems, however, they have involved considerable structural expenditure.

There are hammer drills which have a relatively complicated tool receptacle permitting an adjustment of the axial working position of the tool relative to the percussion piston. Accordingly, the tool projects to a greater or lesser degree into the effective range of the percussion piston. Such an arrangement is very complicated and likely to break down and, in addition, leads to an increase in the structural length of the hammer drill with the consequence that it becomes top-heavy.

Another significant disadvantage of the hammer drill mentioned above is that the actuation of the drive piston also reciprocates the percussion piston during no-load operation. Since the tool mounted in the hammer drill cannot transfer the percussive force transmitted to it by the percussion piston, to a work material, the percussive force must be absorbed in the device. Under such conditions there may be considerable damage to the hammer drill. As a result, devices have been developed for cushioning the percussion piston when it reciprocates during no-load operation. Such devices are also complicated, difficult to operate and, because of the great stress placed on them, their useful lifetime is limited.

In such a hammer drill the pinion which drives the shaft also provides for the rotation of the tool. Therefore, a rotary drive is needed which forms a second drive unit, practically independent of the percussion drive. Consequently, such hammer drills have complicated and complex drives taking up a lot of space with the disadvantage that the devices are very heavy.

Therefore, it is the primary object of the present invention to provide a compact hammer drill of simple construction so that it is possible to adjust automatically the percussion forces to the use conditions and also to enable in a simple manner to cut off the transmission of percussive force during no-load operation of the device.

In accordance with the present invention, the bearing supporting the eccentric shaft within the drill housing is rotatable about the axis of the pistons and the drive for the shaft is effected by interengaging the eccentric shaft with a contact rim which can be secured against rotational movement while the bearing rotates relative to it.

As in the known devices, the hammer drill includes a guide cylinder in which the drive piston is reciprocated by the shaft. The movement of the drive piston is transmitted to the percussion piston via an air cushion separating the two. The drive piston can be a conventional solid piston or a so-called plunger piston having a bore in which the percussion piston is slidably mounted.

Preferably, the bearing supporting the shaft is symmetrical with respect to its axis of rotation which corresponds to the axis of the drive piston. At its circumferential periphery, the bearing has a toothed rim in meshed engagement with a pinion driven by a motor mounted on the hammer drill. The pinion drives the bearing about its axis of rotation. As a practical matter, the guide cylinder is connected to the forward end of the bearing so that when the bearing is rotated the guide cylinder also rotates. This drive arrangement which provides both the percussive force and the rotation of the drive cylinder and consequently of the tool connected directly or indirectly to the front of the guide cylinder, is characterized by a structural simplicity with few structural components and, as a result, a compact design.

To drive the shaft, it is arranged in meshed engagement with a contact rim supported on the bearing with the contact rim held stationary while the bearing rotates. The contact rim is secured against rotation by an annular member secured to the housing of the hammer drill. When the hammer drill is in use, the shaft and the contact rim are in intermeshed engagement. To afford the selective contact between the contact rim and the brake member, the bearing supporting the shaft and the contact rim and the guide cylinder supporting the tool are arranged to be axially slidable relative to the hammer drill housing.

To afford a form-locking drive of the shaft it is preferable for the shaft and the contact rim to be in meshed interengagement. Such an arrangement provides non-slip power transmission and limited wear.

Preferably, the contact rim can be rotated about the piston axis and can be held against rotational movement by a member mounted within the hammer drill housing. Advantageously, the contact rim is annular and in meshed engagement with the shaft while at the same time it laterally encloses the bearing so that relative rotation with the bearing is possible, but it cannot move axially relative to the bearing.

To provide rotation of the bearing relative to the contact rim, the contact rim is held stationary by the housing of the hammer drill. In accordance with the present invention, the contact rim can be moved in the axial direction into frictional engagement with a brake member fixed to the housing. The brake member can be in the form of an insert ring. Therefore, the contact rim acts as a coupling member, that is, providing the drive of the shaft only when the contact rim is held by the brake member from rotating with the bearing. The securement of the contact rim depends on the manner in which the hammer drill is being used. When the tool in the hammer drill is pressed against a target material, the tool displaces the bearing via the guide cylinder in the rearward direction with the contact rim moving into frictional engagement with the brake member in dependence on the pressure exerted by the tool. If the hammer drill along with the tool is lifted off the target material, the contact rim is separated from the brake member so that the shaft is no longer driven, that is, the transmission of percussive force is cut off. If the transmission of percussive force is discontinued, then it is assured that the percussive force transmission mechanism causes no damage to the hammer drill during no-load operation. Since the percussive movement of the drive piston is discontinued, there is no need to provide a stop for the percussion piston.

The type of coupling between the contact rim and the brake member is significant for determining the percussion output transmitted to the tool. To achieve an automatic adjustment of the percussion output to the conditions of use or the contact pressure of the tool, it is preferable if the contact rim and brake member have mutually engageable frictional areas. Preferably, these contact areas have a frusto-conical shape affording, on one hand, larger coupling surfaces and consequently less wear and, on the other hand, permitting sliding of the coupling surfaces relative to one another.

Another feature of the invention involves the axial displacement of the contact rim relative to the brake member against the biasing force of a spring. Advantageously, the spring is supported at its rearward end on the hammer drill housing and at its forward end on the guide cylinder. Normally, the spring biasing action maintains the contact rim in spaced relationship to the brake member as long as the hammer drill tool is not pressed against the target material so that the percussion elements remain inoperative during no-load operation of the device.

In addition, the bearing or the guide cylinder connected with the bearing can be held in a forward position by means of control elements so that the coupling rim is held out of frictional engagement with the brake member. In this manner, the percussion elements of the hammer drill can be reliably disconnected and a pure rotary drive of the hammer drill tool can be accomplished.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
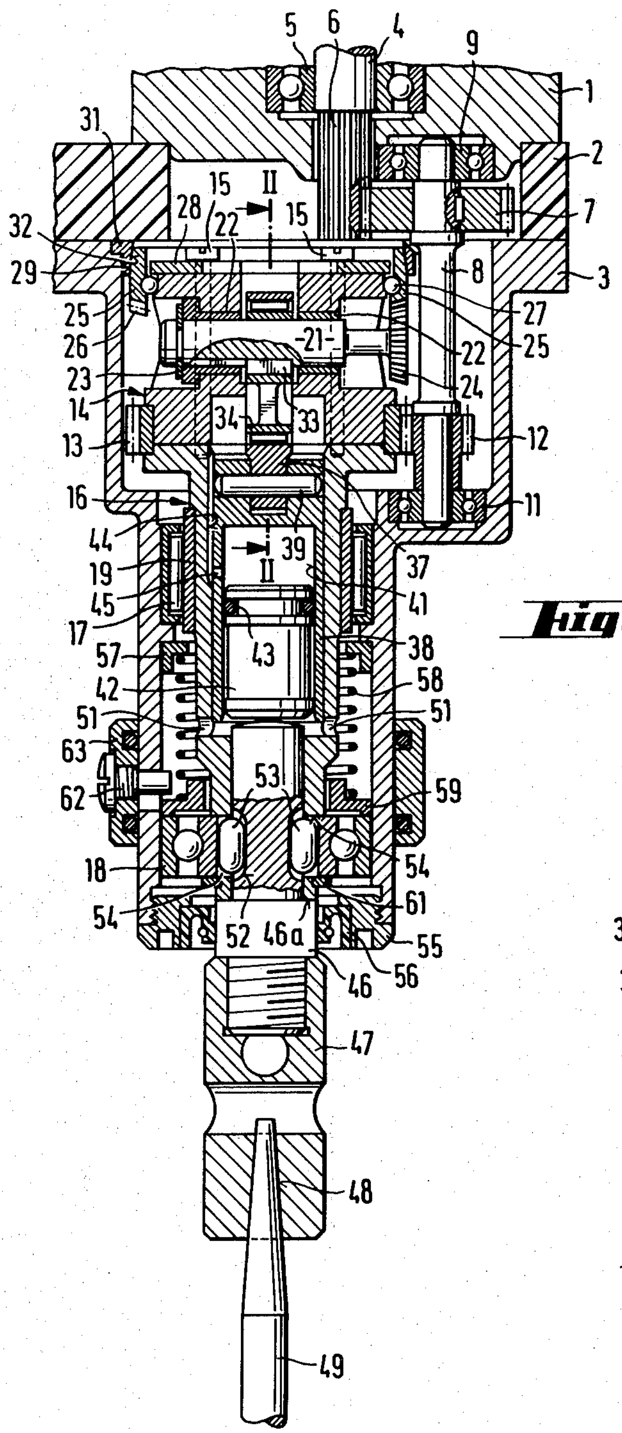
FIG. 1 is an axially extending sectional view of the forward portion of a hammer drill embodying the present invention and shown in the operating position.
Figure 3:
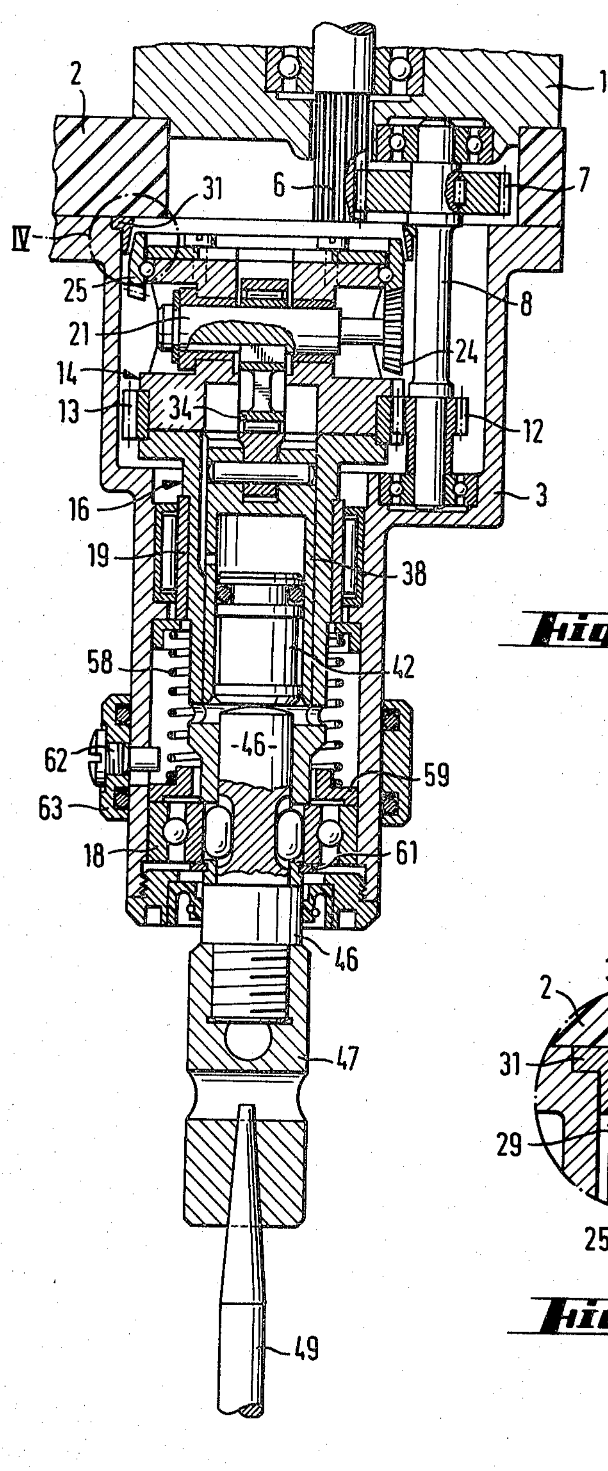
FIG. 3 is a sectional view similar to that shown in FIG. 1, illustrating the hammer drill in the inoperative or no-load position.

As shown in FIGS. 1 and 3 the hammer drill has a motor housing 1 connected by an intermediate flange 2 to a drive assembly housing 3 located at the front end of the hammer drill. For reasons of simplification, the rearward part of the hammer drill, including a motor, handle and starting element have been omitted. As viewed in FIGS. 1 and 3, the lower part of the drive assembly housing 3 is the forward end and the rearward end is spaced upwardly from it.

In motor housing 1, a motor shaft 4 extends in the forward end-rearward end direction and is rotatably supported and guided in a ball bearing 5. At its lower or forward end, the motor shaft 4 forms a driving pinion 6 projecting out of the motor housing 1 and in meshed driving engagement with a gear wheel 7. Gear wheel 7 is mounted on the upper or rearward end of a transmission shaft 8. Transmission shaft 8 is rotatably supported at its rearward end in a ball bearing 9 located within the motor housing 1 and at its forward end in a ball bearing 11 positioned in the drive assembly or the gear housing 3. A pinion 12 is fixed to the transmission shaft 8 adjacent its forward end so that it rotates with the transmission shaft. Pinion 12 is in meshed engagement with a toothed rim 13 fixed on a bearing 14. The bearing 14 is a symmetrical body with respect to its axis of rotation which axis extends in the forward end-rearward end of the hammer drill. An axially extending guide cylinder 16 extends downwardly from the lower or forward end of the bearing 14 and screws 15 interconnect the bearing and the guide cylinder into a structural unit.

The unitary bearing 14-guide cylinder 16 is rotatably mounted in the gear housing 3 with the guide cylinder being rotatably supported by a roller bearing 17 closer to the bearing 14 and by a ball bearing 18 adjacent the lower or forward end of the gear housing 3. Furthermore, the guide cylinder 16 along with the bearing 14 is axially slidable within the housing 3 for a limited extent and this axial movement is assured by a liner 19 laterally enclosing the guide cylinder 16 and positioned within the roller bearing 17. In addition the ball bearing 18 is not fixed in position within the gear housing so that a certain amount of axial movement of the ball bearing is possible.

Figure 4:
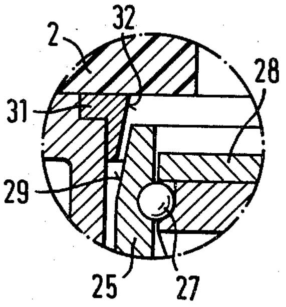
FIG. 4 is an enlarged detail view of the portion of the hammer drill identified by IV in FIG. 3.

An shaft 21 extends through the bearing 14 and is arranged perpendicularly to the axis of rotation of the bearing which extends in the forward end-rearward end direction of the hammer drill. The shaft 21 is rotatably supported in friction bearings 22. A safety ring 23 secures the axial position of the shaft. A bevel gear 24 is formed on one end of the shaft 21 and meshes with a bevel toothed surface 26 on an annular contact rim 25. Contact rim 25 is concentrically arranged around the rearward end of the bearing 14 and balls 27 located between the inside surface of the contact rim and the bearing assures relative rotation between the contact rim and the bearing and also secure the axial position of the contact rim. A cover plate 28, held on the bearing 14 by the screws 15, secures the balls 27 against escaping rearwardly from between the contact rim and the bearing. In the operating position of the hammer drill as shown in FIG. 1, the contact rim has an outer frusto-conical friction surface 29 in force-locked contact with an annular brake member 31 laterally encircling the contact rim. Brake member 31 has an inner frusto-conical frictional surface 32 corresponding to the similar surface 29 and these two surfaces are in frictional contact in the operating position. In FIG. 4 these surfaces are shown on an enlarged scale separated from one another in the inoperative position of the hammer drill. Brake member 31 is fixed in the drive assembly or gear housing 3 so that it does not rotate.

Figure 2:
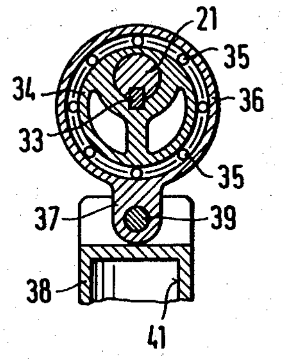
FIG. 2 is a sectional view through the percussive drive elements of the hammer drill taken along the line II—II in FIG. 1.

As can be seen in FIG. 2, shaft 21 is secured against rotation relative to an eccentric cam 34 by a key 33. As illustrated in FIG. 2 the cam 34 is eccentric to the shaft 21 and has a circular peripheral configuration enclosed by a ring bearing 36. Rolling bodies 35 interconnect the cam 34 and the ring bearing 36. A piston rod 37 projects outwardly from the ring bearing 36 and is connected by a cross pin 39 to a drive piston 38 constructed as a plunger piston and slidable within the guide cylinder 16.

Drive piston 38 contains an axially extending bore 41 in which an axially slidable percussion piston 42 is positioned with a sealing ring 43 seated in a groove in the percussion piston and disposed in contact with the surface of the bore 41. When the shaft 21 transmits reciprocal movement to the drive piston 38, this movement is transmitted to the percussion piston via an air cushion located within the bore 41 between the rearward end of the percussion piston and the rearward end of the bore. For maintenance of the air cushion, an equalizing duct 44 is located between the inside surface of the guide cylinder 16 and the outside surface of the drive piston and is connected to an equalizing bore 45 extending through the wall of the drive piston into the bore 41. The function of the equalizing duct 44 and equalizing bore 45 is not explained in detail because such an arrangement is known.

The percussion piston 42 transmits its kinetic energy in the form of percussive strokes against a transmission shaft 46 slidably mounted in the forward end of the guide cylinder 16. Transmission shaft 46 conveys the percussive force directly to a tool receptacle 47, known per se, in which a tool 49, such as a drill, is secured via a frusto-conical connection 48. To prevent any interference with the movement of the percussion piston 42 by air in front of it, ventilation ducts 51 extend through the guide cylinder 16 ahead of the forward end of the drive piston 38.

To provide for the axial slidability of the transmission shaft 46, longitudinally extending grooves 52 are formed in the transmission shaft and cylindrically shaped locking elements 53, shorter in length than the grooves 52, project inwardly into the grooves and outwardly into window-shaped openings 54 in the forward end of the guide cylinder 16. The locking elements interconnect the guide cylinder 16 and the transmission shaft 46 for affording a rotary connection between the two. To prevent any penetration of dirt into the interior of the hammer drill and also to avoid any leakage of lubricants out of the hammer drill, the forward end of the gear housing 3 has a closure 55 and a retaining ring 56 which encloses the transmission shaft 46 in a sealing manner.

Within the gear housing an axially extending spring 58 encircles the guide cylinder 16 and extends between a centering ring 57 at its rearward end and a shoulder ring 59 at its forward end. Shoulder ring 59 contacts the rearward side of the ball bearing 18 which, in turn, bears at its forward end against a fastening ring 61 secured in the guide cylinder 16.

With regard to the manner of operation of the hammer drill, concerning the operating position shown in FIG. 1, the hammer drill is held with the tool 49 pressed against the target material, now shown, while the motor is switched on. As a consequence of the pressure exerted by the tool against the target material, the tool 49, the tool receptacle 47 and the transmission shaft 46 move rearwardly into the housing assembly 3 against the force of the spring 58 causing the guide cylinder 16 and the bearing 14 connected to it to move rearwardly so that the contact rim 25 is forced into contact with the brake member 31. Accordingly, the frictional surface 29 of the contact rim 25 is displaced into force-locked contact with the frictional surface 32 of the brake member 31. The pinion 6 drives the gear wheel 7 and the transmission shaft 8 so that the pinion 12 also rotates and transmits rotary motion to the toothed rim 13 and, as a result, to the bearing 14 on which the rim is secured. Bearing 14 rotates about its axis extending in the forward end-rearward end direction, which corresponds to the piston axis, causing the shaft 21 to rotate with the bearing. The bevel gear 24 on the shaft 21, in meshed engagement with the bevel toothed rim 26 on the contact rim 25, causes the shaft to rotate about its own axis due to the contact force generated by the contact pressure of the tool 49 acting on the target material. The extent of the force generated by the tool establishes the contact pressure between the contact rim 25 and the brake member 31. As a result, the bevel gear rotates as it rolls on the bevel toothed rim 26.

Due to the rolling action of the bevel gear relative to the contact rim, the shaft 21 is caused to rotate about its own axis. This rotary motion of the shaft is transmitted to its cam 34 via the adjusting spring 33 and a crank motion is provided to the ring bearing 36. As a result, the crank motion causes the drive piston to reciprocate because of the connection afforded by the piston rod 37 and the cross pin 39. The reciprocating movement of the drive piston 38 places the percussion piston 42 into a similar motion so that the kinetic energy of the percussion piston is transmitted in the form of percussive strokes to the transmission shaft 46 and then through the tool holder 47 to the tool 49.

If the hammer drill is lifted off the target material then it assumes the position shown in FIG. 3, that is, the inoperative or no-load position. In this position there is no force pressing the tool holder 47 inwardly via the tool 49, and the spring 58 pressing against the shoulder ring 59 biases the guide cylinder 16 along with the bearing 14 in the forward end direction. The forward movement provided by the spring 58 also pushes the ball bearing 18 and the support ring 61 into the indicated forward position. FIG. 4 shows an enlarged detail of the relative positions of the contact rim 25 and the brake member 31 when this forward displacement occurs. The corresponding frusto-conical surfaces 29, 32 of the contact rim 25 and the brake member 31 are separated so that there is no longer any frictional contact between them. If the hammer drill motor continues to operate and drive the pinion 6 its motion is transmitted through the gear wheel 7, the transmission shaft 8 and the pinion 12 to the toothed rim 13 on the bearing 14 so that the shaft rotates or is carried along with the bearing 14 as it, the bearing, rotates about its axis which extends in the forward end-rearward end direction. With the contact rim 25 no longer in frictional engagement with the brake member 31, the contact rim then rotates along with the bearing 14. Consequently, there is no relative rolling action between the bevel gear 24 and the bevel toothed surface 26 and the shaft does not rotate about its own axis and the cam 34 is not driven. Therefore, the drive piston is not driven in a reciprocating manner and, as a result, the percussion mechanism of the hammer drill is rendered inoperative.

The disengagement of the contact rim from the brake member can be effected for assuring the rotary motion of the hammer drill without any percussive force being transmitted to the tool 49, in a simple manner using appropriate switching means. For this purpose FIGS. 1 and 3 display a sequence switch cam 62 mounted on the gear housing 3 with the cam extending into the interior of the gear housing rearwardly of the shoulder ring 59. By means of an adjusting ring 63, the sequence switch cam can be moved from the position shown in FIG. 1, for instance via a coulisse slot, not shown, in the gear housing 3, into a position located forwardly so that the cam 62 displaces the shoulder ring toward the forward end of the hammer drill approximately into the position shown in FIG. 3. Due to this forward movement of the ring 59 the guide cylinder 16 and its connected bearing 14 along the contact rim 25 are moved forwardly assuring that the contact rim is held out of frictional contact with the brake member 31.

While specific embodiments of the invention have been shown and described in detail to illustrate the application of the inventive principles, it will be understood that the invention may be embodied otherwise without departing from such principles.

What is claimed is:

1. Hammer drill comprising a housing having a forward end and a rearward end, a tool receptacle located in the forward end of said housing, a percussion piston located within said housing and displaceable in the forward end-rearward end direction for delivering percussion force to said tool receptacle, a drive piston located within said housing and extending rearwardly of said percussion piston and displaceable in the forward end-rearward end direction for transmitting percussive force to said percussion piston, means mounted on said housing for transmitting reciprocal movement in the forward end-rearward end direction to said drive piston, said transmission means includes a shaft extending perpendicularly of the forward end-rearward end direction, and a bearing located within said housing for rotation about an axis extending in the forward end-rearward end direction and said bearing rotatably supporting said shaft, a contact rim supported on said bearing with said bearing being rotatable relative to said contact rim, means for interengaging said shaft and said contact rim, and means for holding said contact rim against rotation while said bearing rotates relative to said contact rim for affording the rotation of said shaft about its axis extending perpendicularly of the axis of said bearing.

2. Hammer drill, as set forth in claim 1, wherein said means for interengaging said shaft and said contact rim include teeth formed on each of said shaft and contact rim with said teeth being intermeshed.

3. Hammer drill, as set forth in claim 2, wherein said contact rim being supported on said bearing so that said contact rim can rotate with said bearing.

4. Hammer drill, as set forth in claim 1, wherein said means for holding includes a brake member secured in said housing, said contact rim being displaceable into engagement with said brake member for securing said contact rim against rotation while said bearing rotates.

5. Hammer drill, as set forth in claim 4, wherein said contact rim has an annular friction surface, said brake member has an annular friction surface with the friction surface of said contact rim being displaceable into contact with the friction surface on said brake member.

6. Hammer drill, as set forth in claim 5, wherein said friction surfaces being frusto-conical and being complementarily shaped and said friction surfaces concentrically disposed about the axis of rotation of said bearing.

7. Hammer drill, as set forth in claim 5, including spring means located within said housing for biasing said bearing in the forward end direction for displacing said contact rim out of frictional contact with the frictional surface on said brake member.

* * * * *